UNITED STATES PATENT OFFICE.

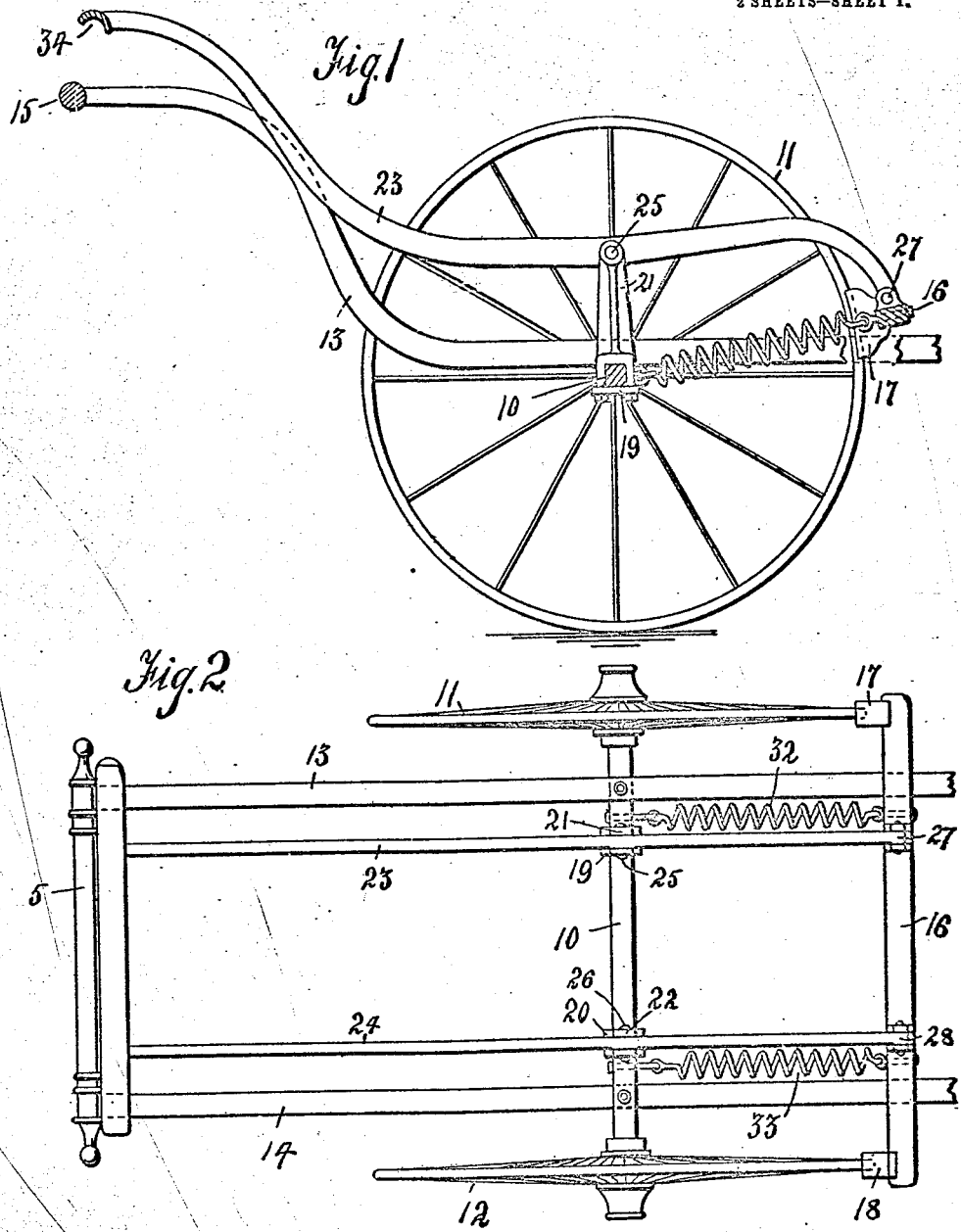

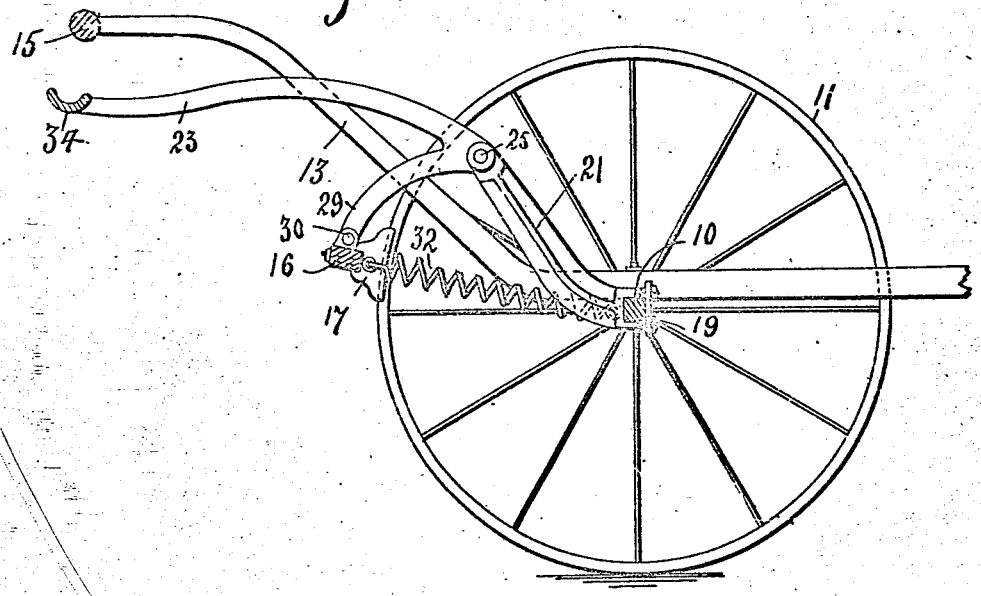
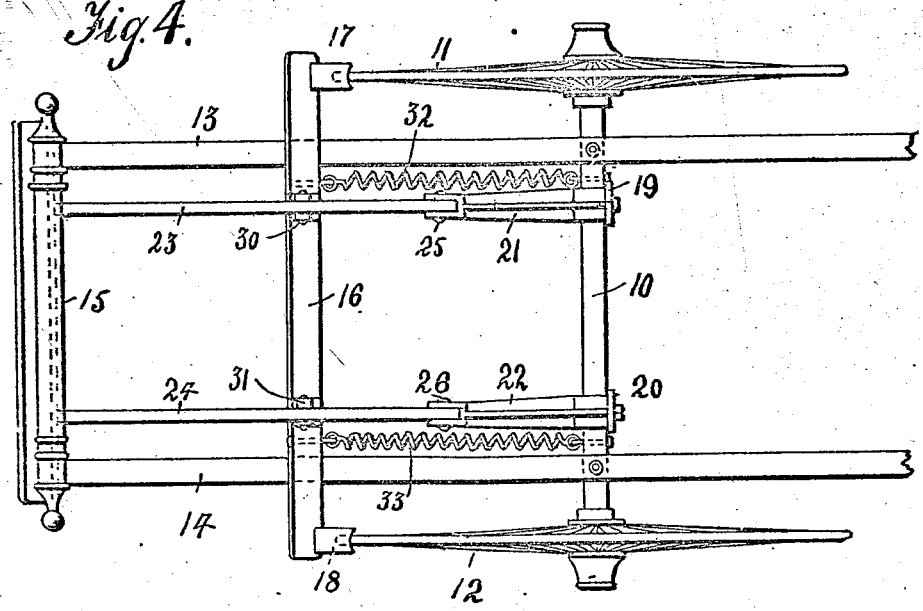

GEORGE LONDRESS, OF GRAFTON, WEST VIRGINIA.

VEHICLE-BRAKE.

No. 898,904.　　　　Specification of Letters Patent.　　Patented Sept. 15, 1908.

Application filed November 14, 1907. Serial No. 402,206.

To all whom it may concern:

Be it known that I, GEORGE LONDRESS, a citizen of the United States, residing at Grafton, in the county of Taylor and State of West Virginia, have invented certain new and useful Improvements in Vehicle-Brakes, of which the following is a specification.

This invention relates to vehicle brakes, more particularly to the brakes adapted for operation in connection with children's carriages, and has for its object to produce a simply constructed and easily applied device, whereby the brake is automatically "set" when the vehicle is stationary, and is released and held in released position by the pressure exerted by the operator while propelling the vehicle.

In the propulsion of children's carriages, many serious accidents occur by reason of the vehicle "running away" when left by itself, and the present invention is designed to automatically set the brake apparatus and thus hold the vehicle from accidental movement in event of the attendant leaving the vehicle.

With these and other objects in view, the invention consists in certain novel features of construction, as hereafter shown and described and specifically pointed out in the claims, and in the drawings illustrating the embodiment of the invention:—Figure 1 represents a sectional side elevation of the rear portion of a child's vehicle, including one of the rear wheels and the rear axle and a portion of the supporting frame, with the brake appliances in position. Fig. 2 is a plan view of the parts shown in Fig. 1. Fig. 3 is a view similar to Fig. 1 illustrating the arrangement of the parts when the brake devices are applied rearwardly of the wheels. Fig. 4 is a plan view of the parts shown in Fig. 3.

In the drawings are shown the rear axle portion 10 and rear wheels 11—12, together with their side bars 13—14 and the handle 15 of a conventional child's carriage, these parts being of the ordinary construction.

The improved attachment comprises a brake beam 16 having brake shoes 17—18, the beam being shown in Figs. 1 and 2 extending transversely of the side bars 13—14 in advance of the wheels 11—12, while in Figs. 3 and 4 the beam is shown arranged transversely of the side bars at the rear of the wheels 11—12, to illustrate the fact that the improved device is applicable without material structural change either to the front or rear sides of the wheels. Attached to the axle 10, as by clips 19—20, or other suitable fastening means, are standards 21—22, the standards having levers 23—24 pivoted as at 25—26 at their upper ends, the forward ends of the levers in Figs. 1 and 2 curving downwardly and connected at 27—28 to the brake beam 16, while in Figs. 3 and 4 the levers extend rearwardly, as at 29 in Fig. 3 and coupled at 30—31 to the beam 16, the slight change in the form of lever being necessary to adapt the device to the application of the brake shoes to the rear sides of the wheels, as hereafter explained. Connected between the brake beam 16 and the axle 10 are tension springs 32—33, the springs operating to maintain the brake shoes normally in engagement with the wheel, and to thus maintain the vehicle normally in braked condition. In Figs. 1 and 2 the levers 23 are extended rearwardly above the handle bar 15 and connected by a hollow member 34, adapted to bear over the handle bar when depressed, and thus constituting a portion of the handle bar. In Figs. 3 and 4 the lever is extended rearwardly with the member 34 disposed beneath the handle bar 15 and adapted to bear against its under side when elevated. In Figs. 3 and 4 the standards 21—22 are of slightly different form to those shown in Figs. 1 and 3, the slight difference in form being necessary to enable the brake apparatus to be applied to the rear sides of the wheel, as will be obvious.

The operation of the device is substantially the same in both forms shown. When the apparatus disclosed in Figs. 1 and 2 is employed, and when the vehicle is to be operated, the attendant compresses the member 34 upon the handle bar 15 and holds these two parts in contact while propelling the vehicle, this disposition of the member 34 causing the forward downwardly curved ends of the levers 23—24 to be elevated, carrying the beam 16 and its shoes 17—18 upwardly free from the wheel and stretching the springs 32—33, and so long as the attendant retains the member 34 in contact with the member 15 the vehicle remains free from the influence of the brake, but the instant that the grip is released from the handle bar the reaction of the springs 32 instantly sets the brake and holds the vehicle rigidly in position. The same operation takes place when the construction shown in Figs. 3 and 4 is employed except that instead of depressing the member 34 the attendant elevates this member, with precisely the same results as before described, the brake in this instance being applied to the rear sides of the wheels instead of to the forward sides, as will be obvious. It will thus be obvious that the two structures are substantially the same and operate to produce precisely the same results in substantially the same manner.

While I have shown the device applied to children's carriages, it will be obvious that it may be applied under certain circumstances to other forms of vehicles, and I do not therefore desire to be limited in the scope of the invention to its application to children's carriages, and also claim the right to such modifications and changes as may be made within the scope of the appended claims.

Having thus described the nature of the invention, what is claimed as new is:—

1. The combination with a vehicle including an axle having bearing wheels and a supporting frame including a handle bar, of a brake beam carrying brake shoes for bearing upon said wheels and movable vertically, springs connected between said brake shoes and axle and operating to normally maintain said shoes yieldably in engagement with the wheels, standards carried by said axle, levers pivoted intermediate their ends to said standards and pivoted at one end to said brake beam, and an auxiliary handle bar connected to said levers at their other ends and extending contiguous to the handle bar of said supporting frame.

2. The combination with a vehicle including an axle having bearing wheels and a supporting frame including a handle bar, of a brake beam extending transversely above said frame and movable upwardly therefrom, brake shoes carried by said beam and adapted to engage said wheels, springs connected at one end to said beam and at their other ends to said axle, standards spaced apart and supported by said axle, levers pivoted intermediate their ends to said standards and pivoted at one end to said brake beam, and an auxiliary handle bar connected to said levers at their other ends and extending contiguous to the handle bar of said supporting frame.

In testimony whereof I affix my signature, in presence of two witnesses.

GEORGE LONDRESS.

Witnesses:
 W. P. WITHERS,
 L. A. RILEY.